(12) United States Patent
Hannula et al.

(10) Patent No.: US 11,777,616 B2
(45) Date of Patent: Oct. 3, 2023

(54) TESTING METHOD AND ARRANGEMENT

(71) Applicant: Nokia Solutions and Networks Oy, Espoo (FI)

(72) Inventors: Juha Hannula, Kiiminki (FI); Marko Koskinen, Oulu (FI); Petri Koivukangas, Kempele (FI); Iikka Finning, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/080,366

(22) Filed: Dec. 13, 2022

(65) Prior Publication Data

US 2023/0111045 A1    Apr. 13, 2023

Related U.S. Application Data

(62) Division of application No. 17/292,920, filed as application No. PCT/EP2018/081007 on Nov. 13, 2018.

(51) Int. Cl.
*H04B 17/00* (2015.01)
*H04B 17/15* (2015.01)
(Continued)

(52) U.S. Cl.
CPC ....... *H04B 17/0085* (2013.01); *H04B 7/0617* (2013.01); *H04B 17/15* (2015.01); *H04B 17/29* (2015.01)

(58) Field of Classification Search
CPC .. H04B 17/0085; H04B 7/0617; H04B 17/15; H04B 17/29; H04B 17/0087; H04B 17/00
(Continued)

(56) References Cited

U.S. PATENT DOCUMENTS 9,654,986 B2    5/2017   Kennedy et al.
9,661,517 B2    5/2017   Stott et al.
(Continued)

OTHER PUBLICATIONS

"Emulator Takes LTE Testing Into the Real World", Microwaves & RF, Retrieved on May 21, 2021, Webpage available at : http://www.mwrf.com/test-amp-measurement/emulator-takes-lte-testing-real-world.

(Continued)

*Primary Examiner* — Fitwi Y Hailegiorgis
(74) *Attorney, Agent, or Firm* — Harrington & Smith

(57) ABSTRACT

A method and arrangement for testing wireless connections is provided. The method comprises obtaining (500) a three-dimensional model of a given environment; obtaining (502) ray tracing calculations describing propagation of radio frequency signals in the given environment; locating (504) one or more devices in the given environment; determining (506) utilising ray tracing calculations the radio frequency signal properties of one or more devices communicating with the device under test; transmitting (508) control information to the radio frequency controller unit for updating the connections between one or more devices and a set of antenna elements to match with the determined properties; obtaining (510) information on the location and propagation environment of the one or more devices and updating (512) the radio frequency signal properties of the one or more devices if the location or propagation environment changes.

13 Claims, 6 Drawing Sheets

(51) Int. Cl.
*H04B 17/29* (2015.01)
*H04B 7/06* (2006.01)

(58) Field of Classification Search
USPC .......................................................... 375/224
See application file for complete search history.

(56) References Cited

U.S. PATENT DOCUMENTS

| | | | |
|---|---|---|---|
| 2009/0128562 A1* | 5/2009 | McCombe | .............. G06T 15/06 |
| | | | 345/427 |
| 2012/0071107 A1 | 3/2012 | Falck et al. | |
| 2014/0024318 A1 | 1/2014 | Sevindik et al. | |
| 2016/0212641 A1 | 7/2016 | Kong et al. | |
| 2016/0233970 A1 | 8/2016 | Reed | |
| 2018/0027434 A1 | 1/2018 | Foegelle | |

OTHER PUBLICATIONS

"Spirent Collaborates to Demonstrate World's First 5G Over-the-Air Massive MIMO Beamforming RF Test Bed", IndiaOnline, Retrieved on Jun. 12, 2018, Webpage available at : http://news.indiaonline.in/press-releases/spirent-collaborates-to-demonstrate-world-s-first-g-over-the-air-massive-mimo-beamforming-rf-test-bed-58926.

"Propsim Channel Emulation Solutions", Keysight, Retrieved on Jun. 11, 2018, Webpage available at : https://www.keysight.com/en/pc-2697334/propsim-channel-emulation-solutions?cc=IN&lc=eng.

"See the Invisible Wireless Signals Around you with this Augmented Reality App", The Verge, Retrieved on May 21, 2021, Webpage available at : https://www.theverge.com/2015/11/28/9811910/augmented-reality-app-lets-you-see-wireless-signals.

Nguyen et al., "Leveraging an Agile RF Transceiver for Rapid Prototyping of Small-Cell Systems", IEEE 82nd Vehicular Technology Conference (VTC2015-Fall), Sep. 6-9, 2015, 5 pages.

Nguyen et al., "BeamViewer: Visualization of dynamic antenna radiation patterns using Augmented Reality", IEEE Conference on Computer Communications Workshops (INFOCOM WKSHPS), Apr. 10-14, 2016, 2 pages.

Invitation to Pay Additional Fees and Partial Search Report received for corresponding Patent Cooperation Treaty Application No. PCT/EP2018/081007, dated Jul. 12, 2019, 12 pages.

International Search Report and Written Opinion received for corresponding Patent Cooperation Treaty Application No. PCT/EP2018/081007, dated Sep. 5, 2019, 17 pages.

* cited by examiner

TESTING METHOD AND ARRANGEMENT

RELATED APPLICATION

This application is a divisional of U.S. application Ser. No. 17/292,920, filed May 11, 2021, which is incorporated by reference in its entirety, which is a National Stage Application of PCT Application No. PCT/EP2018/081007, filed Nov. 13, 2018, which is incorporated by reference in its entirety.

TECHNICAL FIELD

The exemplary and non-limiting embodiments relate to method and arrangement for testing wireless connections.

BACKGROUND

Wireless telecommunication systems are under constant development. There is a constant need for higher data rates and high quality of service. Partly for these reasons the modern telecommunication systems, such as fifth generation, 5G, networks are moving towards millimeter-wave, mmW, frequencies to seek for wide spectrum access, which eventually enables extremely high data rates.

To achieve high capacity and data rate phased antenna arrays are planned to be used in the transmission and reception of signals. Phased antenna arrays typically comprise a multitude of antennas separated from each other by a given distance. A signal to be transmitted is fed to a number of antennas comprising an antenna array and the signal to each antenna is phased in such a manner that the antenna array forms an antenna beam, so called main lobe, to a desired direction.

Multiple-input multiple-output, or MIMO, is a term that is used for a method of transmitting and receiving of more than one data signal simultaneously over the same radio channel. Massive MIMO, mMIMO, is a term used when the number of antennas is large.

Algorithms related to MIMO and mMIMO are complex and over the air measurements are often need to obtain performance data of the systems. This is a burdensome and expensive task.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

BRIEF DESCRIPTION OF DRAWINGS

One or more examples of implementations are set forth in more detail in the accompanying drawings and the description below. Other features will be apparent from the description and drawings, and from the claims.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
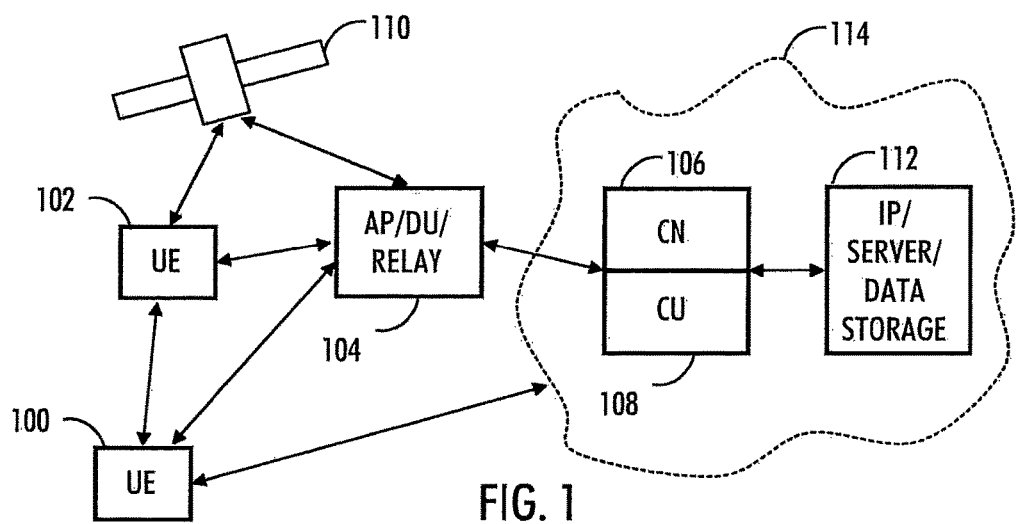
FIG. 1 illustrates a general architecture of an example communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for data and signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 106 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network, which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably will be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned, radio access network may be split into two logical entities called Central Unit (CU) and Distributed Unit (DU). In prior art, both CU and DU supplied by the same vendor. Thus they are designed together and interworking between the units is easy. The interface between CU and DU is currently being standardized by 3GPP and it is denoted F1 interface. Therefore in the future the network operators may have the flexibility to choose different vendors for CU and DU. Different vendors can provide different failure and recovery characteristics for the units. If the failure and recovery scenarios of the units are not handled in a coordinated manner, it will result in inconsistent states in the CU and DU (which may lead to subsequent call failures, for example). Thus there is a need to enable the CU and DU from different vendors to coordinate operation to handle failure conditions and recovery, taking into account the potential differences in resiliency capabilities between the CU and DU.

As mentioned, antenna arrays with multiple antennas are utilized in modern wireless communication systems. In an embodiment, the antenna array comprises a set of phased subarrays each comprising a set of antennas and each configured to transmit or receive an independent data signal utilising a beam at a given direction.

Phased antenna arrays are particularly useful at high frequencies such as mmW frequencies as due to the high frequency multiple antennas may be designed with a relatively compact form factor. Using many antennas in an array improves the directivity and this high antenna directivity may be used to compensate for high path losses at higher frequencies.

In MIMO, typically multiple antennas in an antenna array are used for transmitting and receiving each data signal. In Massive MIMO, mMIMO, the number of antennas is large. With a large number of antenna elements in an antenna array, it is possible to allocate one or more beams specific to each user. It is also possible to allocate a beam to each user and control the beam to follow a moving user.

Beamforming and mMIMO introduce new possibilities and challenges in the design and use of telecommunication systems. Beamforming and mMIMO requires complex processing in (e/g)NodeBs and measuring actual performance of transmissions requires often over the air measurements as most of the components are integrated directly to the antenna. Measurements can be done for example using a moving car equipped with suitable measurement hardware. However, these measurements are costly and one-time measurements runs. A situation cannot be re-examined as the outside conditions are subject to change constantly. Thus, there is growing need to simulate different real life use cases in a controlled manner.

Figure 2A:
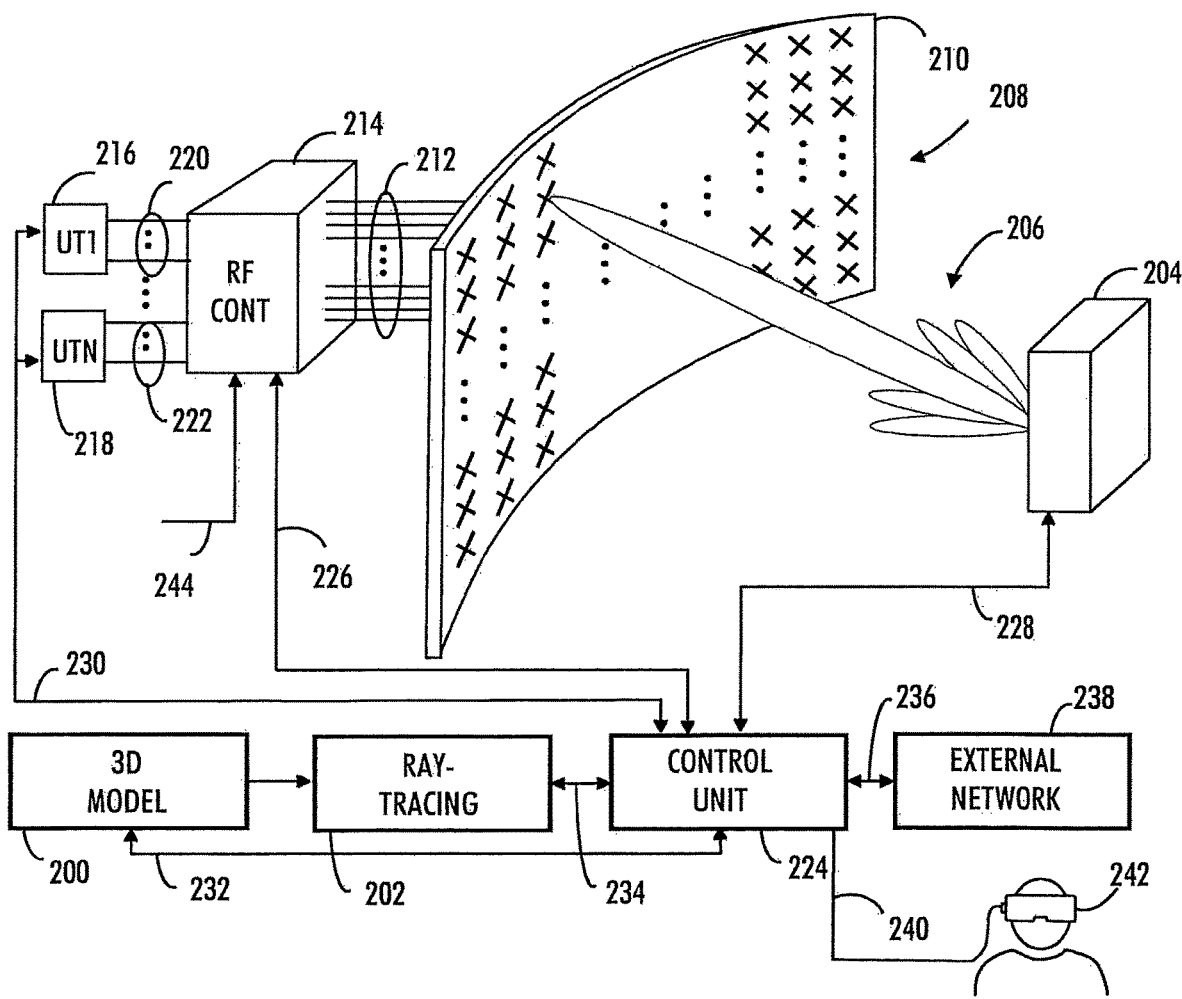
FIGS. 2A and 2B illustrate examples of a general architecture of a test arrangement of an embodiment.

FIG. 2A illustrates an embodiment. The figure illustrates an example of an arrangement for testing or simulating the operation of a base station, access point or (e/g)NodeB, and user terminals connected to the (e/g)NodeB. The arrangement of FIG. 2A comprises various apparatuses which all are not needed in all embodiments. Simulations and tests may be performed in various ways with variable hardware and software, as one skilled in the art is aware. Some examples of different simulation cases are discussed below.

In an embodiment, the arrangement may comprise an apparatus 200 to obtain a three dimensional, 3D, model of a given physical environment. The environment may be a city, a stadium, a factory, any outside or inside area or a room or a section of a building, or a mixture of different types of environments, for example. The apparatus may create the 3D model or obtain the model from a known source.

In an embodiment, the arrangement may comprise an apparatus 202 to perform raytracing in a given physical environment, from which there exists a 3D model. Ray tracing is a known technique to obtain a model of how radio signals propagate, multipath propagate, reflect and scatter in a given environment.

The arrangement comprises a device under test, DUT, 204, which in this embodiment is a base station, access point or (e/g)NodeB, or a remote radio head of a base station. The DUT 204 may be configured to transmit a radio signal 206. The DUT may be with or without beamforming capability.

Thus the DUT may transmit utilising one or more beams which may be moving beams or have a fixed direction or the DUT may utilise a known transmission pattern in transmission.

In an embodiment, the arrangement comprises a set of antenna elements 208 which may be installed in the form of a wall structure 210, where the antenna elements are placed as an array with given distance from each other. The distances between antenna elements may be constant or they may vary. The number of the antenna elements and the size of the wall structure may be a design parameter and may depend on the implementation.

Each of the antenna elements is connected 212 to a radio frequency, RF, controller 214. In addition, one or more devices 216, 218 are connected 220, 222 to the RF controller. The one or more devices 216, 218 may be user terminals, signal generators or measurement devices such as spectrum analysers or power meters.

In an embodiment, the arrangement comprises a control apparatus 224 connected 226 to the RF controller 214 and to 228 the DUT 204. The apparatus 224 may be configured to control the operation of the RD controller. In an embodiment, the apparatus is connected 230 to the one or more devices 216, 218. The apparatus may also receive 232 3D model and raytracing data 234 from apparatuses 200, 202. The apparatus 224 may also be connected 236 to external networks 238 such as the Internet. In an embodiment, the apparatus 224 may be connected 240 to a set of virtual reality (VR) or augmented reality (AR) glasses 242 worn by a user. Instead or in addition to glasses 242 displays may be used.

In an embodiment, the RF controller 214 comprises additional inputs 244 which enable giving commands to the RF controller.

The above description of a testing arrangement is an example of a possible set up. Different apparatuses and devices may be combined or divided into different physical apparatuses depending on the application, as one skilled in the art is aware. For example, the apparatuses 200 and 202 creating the 3D model and ray tracing and the control apparatus 224 may be performed in the same physical apparatus or they may be also located elsewhere and be accessible via the Internet. Various modifications to the setup of FIG. 2 are available depending on the application.

The arrangement of FIG. 2A can be used for testing the operation of a device under test 204, i.e base station, access point, (e/g)NodeB or a corresponding apparatus, by enabling communication with the one or more devices 216, 218.

The DUT 204 may be configured to establish a connection with the one or more devices 216, 218 by transmitting one or more beams 206 towards the wall structure 210 comprising a set of antenna elements 208.

The RF controller 214 is configured to enable routing of RF signals between the one or more devices 216, 218 and the set of antenna elements. The RF controller may be configured to connect each of the devices 216, 218 to one or multiple antenna elements on the wall structure 210. The antenna elements to which the device is connected to, and thus the location of the connection point or points of the device on the wall structure can be changed. This corresponds to a moving user from the DUT 204 point of view.

The RF controller is further configured to manipulate or control the RF signals if needed. The manipulation or control may comprise attenuating or delaying the signal and changing the phase of the signal.

Thus from the DUT 204 point of view, the location and the RF signal properties of the devices 216, 218 change as if the devices were in a natural environment, such as a city, a stadium, a factory, any outside or inside area or a room or a section of a building, for example.

In an embodiment, the actions performed by the RF controller 214 are synchronized in time. The RF controller may maintain a log of all actions performed by the RF controller. For example, changing the signal location happens exactly at the same time for each device 216, 218, changing the attenuation happens exactly at the same time for each device 216, 218 and so on. This enables repeatable, reliable and precisely controlled test sequences. For example, a given test scenario can be repeated exactly the same way as many time as needed until the DUT 204 is functioning as wanted and solutions of the problems are working. Also logs of the participating devices (for example logs from the DUT and devices 216, 218) can be synchronized with the log of RF controller to have a complete and synchronized set of logs.

In an embodiment, the control apparatus 224 connected 226 to the RF controller 214 and to 228 the DUT 204 may control a test simulation. The apparatus 224 may obtain a three-dimensional model of a given environment and a ray tracing results of the same environment. The ray tracing information enables the test arrangement simulate RF behaviour of transceivers in the modelled environment utilising in a physical laboratory space having real DUT and real devices 216, 218.

In an embodiment, a real world location is converted to digital 3D model. The control apparatus 224 may place real devices 216, 218 connected to the RF controller 214 in given locations in the 3D model environment. Utilising ray tracing information, the control apparatus 224 may control the RD controller to simulate the RF environment experienced by the devices 216, 218 to be the same as if they were in real world location. The devices 216, 218 communicate with the DUT 204 and the RF controller 214 controls the properties of the RF signals between the DUT and the devices 216, 218 by adjusting the amplitudes, delays, and phases (for example) and the antenna elements the devices 216, 218 are connected to. Thus all multipath propagations, reflections, diffractions, fading profiles experienced by user terminals in a real world situations may be realised in the test arrangement in a controlled and synchronized manner. All test simulation actions and results may be stored and replayed if needed.

Several kinds of test situations are possible in the proposed test arrangement. For example, for a DUT 204 such as a base station or access point data throughput may be tested with one static user terminal, multiple static user terminals, one moving user terminal with varying velocity or multiple moving user terminals with varying velocities or combinations of these cases, for example.

In an embodiment, one of the user terminal may be replaced with a spectrum analyser or power meter. This enables the e.g. power density measurement in each antenna location. For example, the base station capability to direct RF energy exactly towards user can be tested this way.

In an embodiment, replacing one of the user terminals with a signal generator enables creation of interference towards the base station.

Figure 2B:
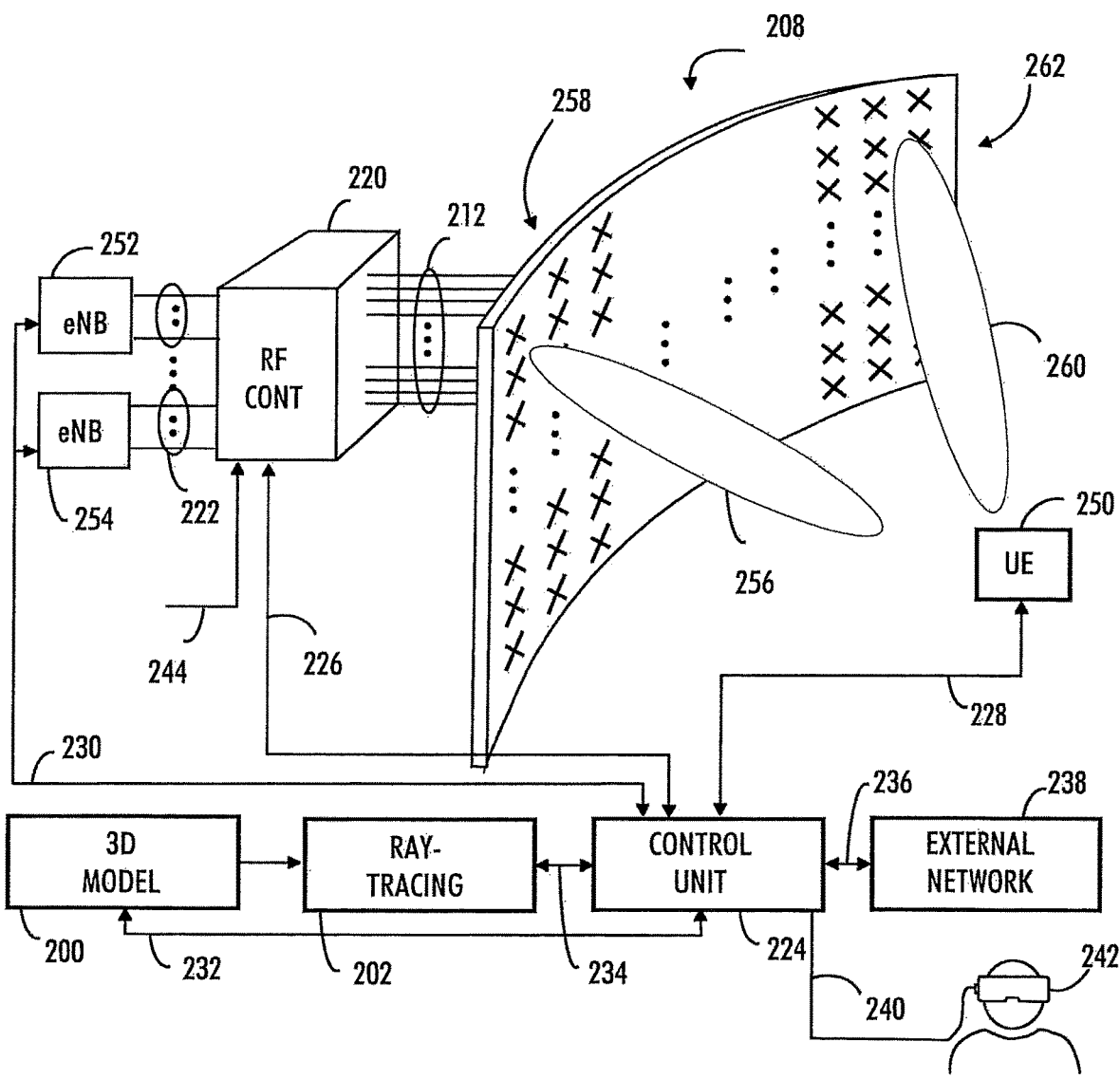

FIG. 2B illustrates an embodiment. The figure illustrates an example of an arrangement for testing or simulating the operation of user terminal or user terminals connected to one or more (e/g)NodeBs. The arrangement of FIG. 2B is from hardware point of view similar to the arrangement of FIG. 2A and description of apparatuses is not repeated here. Simulations and tests may be performed in various ways with variable hardware and software, as one skilled in the art is aware. Some examples of different simulation cases are discussed below.

In this embodiment, the device under test, DUT, 250, is a user terminal or user terminals. As with the embodiment of FIG. 2A, the arrangement comprises a set of antenna elements 208 which may be installed in the form of a wall structure 210. Each of the antenna elements is connected 212 to the RF controller 214. In addition, one or more devices 252, 254 are connected 220, 222 to the RF controller. In this embodiment the one or more devices 252, 254 may be base stations, access points or (e/g)NodeBs, or remote radio heads of base stations. In this example there are two devices 252, 254 such as base stations or access points but the number of the devices is not limited to two.

In an embodiment, a signal 256 from base station or access point 252 may be directed to a given antenna element 258 on the wall 208. In this example the element 258 is on left side of the wall. Further, a signal 260 from base station or access point 254 may be directed to another given antenna element 262 on the wall 208. In this example the element 262 is on right side of the wall. The DUT, or user terminal 250 needs to decide which of the signals 256, 260 it will start to follow. With the aid of the RF controller 220, these signals 256, 260 from two base stations 252, 254 can be manipulated in terms of RF properties such as power or delay and performance, for example and the behavior of the user terminal(s) 250 can be monitored.

In another example, a signal from base station 252 is directed to a given antenna element on the wall, and then the signal is moved to a next antenna element with a given attenuation and so forth. The user terminal experiences this as movement or rotation of the user terminal. The performance and behavior of the user terminal is such a situation can be monitored.

In another example, is a signal from a given base station is directed to multiple antenna elements with given attenuations and RF properties. The user terminal receives experiences this as a multipath propagation of the base station signal and operation of the user terminal may be monitored. Various other simulations may also be performed to test the operation of user terminals.

Figure 3:
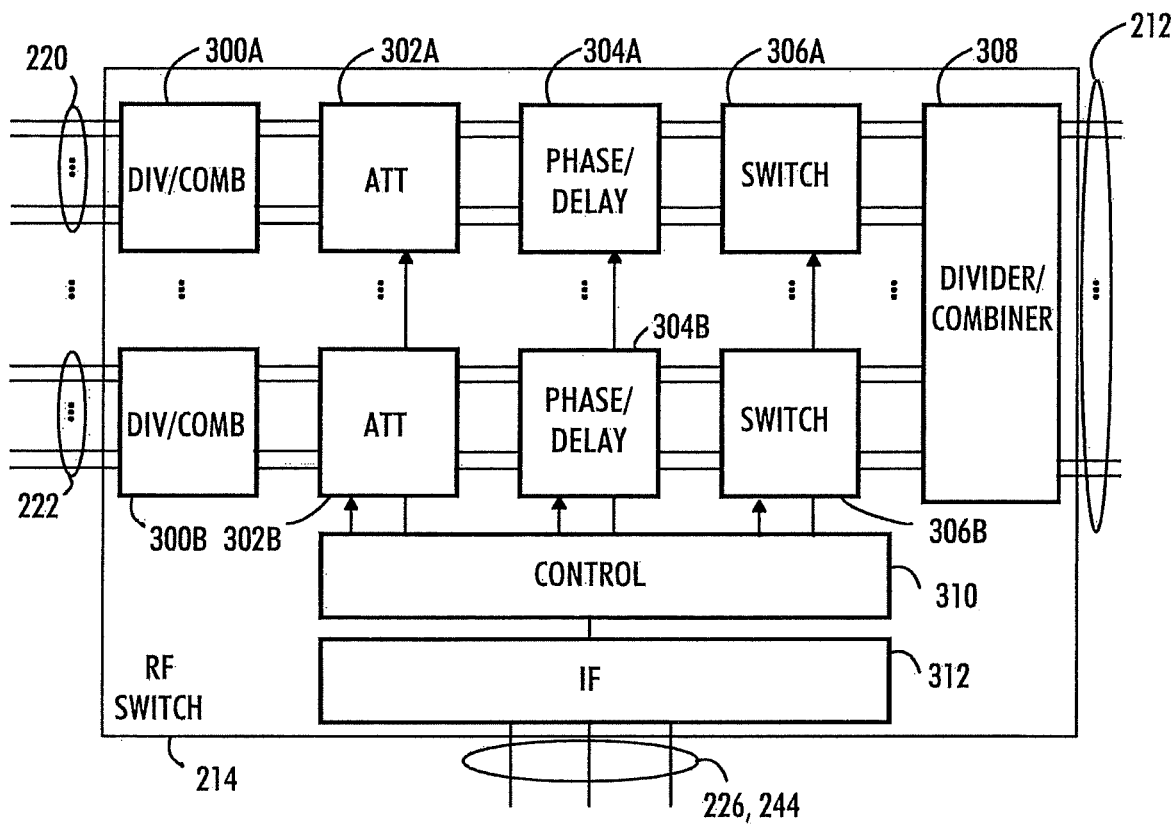
FIGS. 3 and 4 illustrates a simplified example of an apparatus in which some embodiments of the invention may be applied

FIG. 3 illustrate an example of the realisation of the RF controller 214. The RF controller comprises a circuitry 300A, 300B connecting 220, 222 one or more devices to the RF controller. In an embodiment, the circuitry may be one or more divider/combiner units 300A, 300B. The RF controller further comprises a circuitry 308 connecting 212 the one or more devices to a set of antenna elements 208. In an embodiment, the circuitry may be a divider/combiner unit 308.

The signals to and from the one or more devices 216, 218 may be manipulated or controlled in the RF controller based on control from the processing unit 310 of the RF Controller.

The RF controller may comprise an interface 312 connected to the processing unit 310 and configured to transmit and receive data 226, 244 with external apparatuses. The processing unit 310 may be configured to receive control instructions from external apparatuses and exchange data related to the operation of the RF controller with external apparatuses.

The processing unit 310 may also comprise a user interface with which the operation of the RF controller may be controlled.

The RF controller connects the signals from the one or more devices 216, 218 or 252, 254 to a set of antenna elements and vice versa. Below the signal processing is described in the transmission direction from the devices to the antennas. In the opposite direction is the operation of the RF controller is the same as one skilled in the art is aware.

In an embodiment, the RF controller 214 comprises one or more circuitries configured to synchronically adjust connections and the power, phase and delay of signals between the one or more devices and the set of antenna elements based on control signals from the processing unit.

In an embodiment, the signals from the divider/combiner units 300A, 300B are taken to attenuator units 302A, 302B controlling the amplitude of the signals. The control may be done using methods known in the art. From the attenuator units 302A, 302B the signal are taken into phase/delay units configured to control the phase and delay of the signals. The control may be done using methods known in the art. Next the signals are taken to switching units 306A, 306B. The switching units may be configured to connect the signals via the divider/combiner 308 to desired antenna elements.

Connecting the signals via the divider/combiner 308 to desired antenna elements may be done by switches, by attenuating unwanted signals or a combination of both.

In an embodiment, the units of the RF controller are controlled by the processing unit 310 in a synchronised manner. For example, changing the attenuation and phase/delay and operation of switching unit happen exactly at the same time for each device 216, 218 or 252, 254 and so on.

Figure 4:
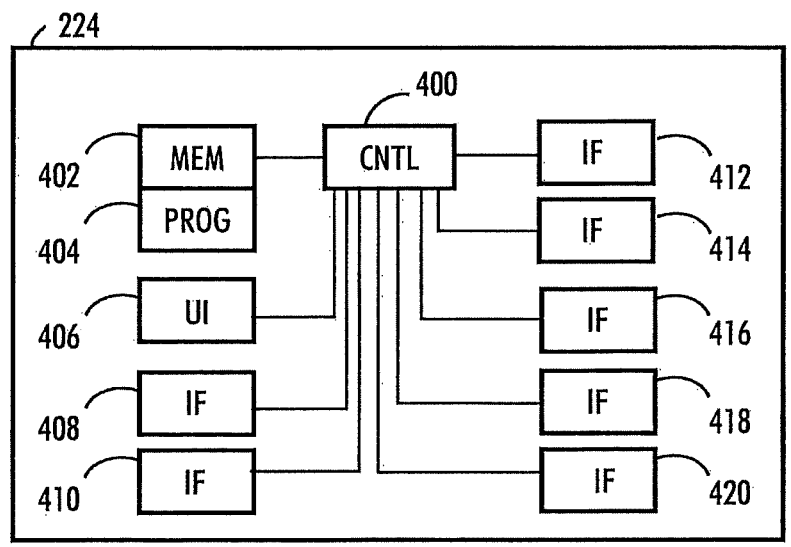

FIG. 4 illustrate an example of the realisation of the control apparatus 224. The figure illustrates a simplified example of an apparatus in which some embodiments of the invention may be applied.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities. For example, the apparatus may be realized using cloud computing or distributed computing with several physical entities located in different places but connected with each other.

The apparatus of the example comprises a control circuitry 400 configured to control at least part of the operation of the apparatus. The apparatus may comprise a memory 402 for storing data.

Furthermore the memory may store software or applications 404 executable by the control circuitry 400. The memory may be integrated in the control circuitry.

The apparatus may comprise a circuitry 406 to communicate with the RF controller unit 214 controlling connections between one or more devices 216, 218 or 252, 254 and a set of antenna elements 208. The apparatus may transmit control command to the RF controller and receive data.

The apparatus may comprise a circuitry 408 a circuitry to communicate with the device under test, DUT, 204, 250 configured to transmit or receive one or more signals to the set of antenna elements. The apparatus may transmit control command to the DUT and receive data.

The apparatus may comprise a circuitry 410 a circuitry to obtain a three-dimensional model of a given environment. The circuitry may communicate with the apparatus 200.

The apparatus may comprise a circuitry 412 a circuitry to obtain ray tracing results of the given environment. The circuitry may communicate with the apparatus 202.

The apparatus may comprise a circuitry 414 a circuitry to communicate with the devices 216, 218 or 252, 254. The apparatus may transmit control command to the devices and receive data.

The apparatus may comprise a circuitry 416 a circuitry to transmit and receive data to and from external networks such as the Internet.

The apparatus may comprise a circuitry 418 a circuitry to connect the apparatus to a set of virtual reality (VR) or augmented reality (AR) glasses 242 worn by a user. Instead or in addition to glasses 242 displays may be used.

All the circuitries 406 to 418 may be communication units utilising wireless or wired communications. The circuitries may be cellular, Bluetooth® or wireless local area network transceivers, for example, or interfaces to wired communication networks. The circuitries 406 to 418 may be operationally connected to the control circuitry 400.

The apparatus may comprise a user interface 420 to enable a user to access the apparatus, to receive commands and display data, for example.

Figure 5:
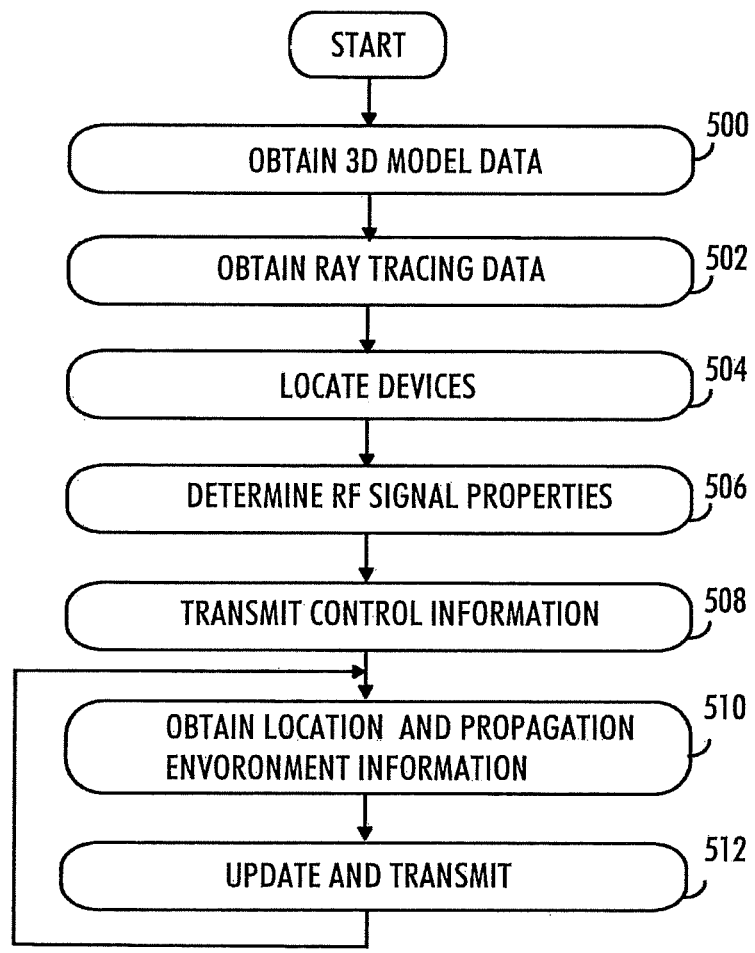
FIGS. 5 and 6 are flowcharts illustrating some examples of embodiments.

The flowchart of FIG. 5 illustrates an example of an embodiment of the operation of the control apparatus 224. The example is described with the example arrangement in FIG. 2A, but is may be applied also in connection with the example arrangement in FIG. 2B as one skilled in the art is aware.

In step 500, the apparatus is configured to obtain a three-dimensional model of a given environment. The model may be obtained from apparatus 200, for example. Any known data format may be used for transferring the information from apparatus 200. A model received from apparatus 200 may be modified by a user utilising user interface of the apparatus 224.

In step 502, the apparatus is configured to obtain ray tracing calculations describing propagation of radio frequency signals in the given environment. The calculations may be obtained from apparatus 202, for example. Any known data format may be used for transferring the information from apparatus 202.

In step 504, the apparatus is configured to locate one or more devices in the given environment. The location of the devices may be received from user interface, from a data file, they may be random, or a combination of these or the locations may be obtained by some other means.

In step 506, the apparatus is configured to determine utilising ray tracing calculations the radio frequency signal properties of one or more devices communicating with the device under test. In an embodiment, the ray tracing calculations may be those received in step 502 or they may be calculated separately.

In step 508, the apparatus is configured to transmit control information to the radio frequency, RF controller unit 214. The RF controller unit may perform control of the signals to and from the one or more devices based on the control information. Thus, the one or more devices connected to the RF controller experience the same RF properties as if they were in the given environment processed by the apparatus 224.

In step 510, the apparatus is configured to obtain information on the location of the one or more devices. The one or more devices or part of them may move on a predetermined path stored in a data file or obtained from user interface or otherwise. The movement of different devices may be obtained using different methods. Some of the devices may be static, some may be computer controlled and some may be controlled by users using the user interface of the apparatus 224 or some user interface apparatuses connected to the apparatus 224.

In an embodiment, also dynamical changing of the propagation environment of the one or more devices and the device under test may be taken into account. The propagation environment may change due to a change in the weather (sunshine, rain, sleet, for example) or trees may fall down or buildings built or changed, or a big vehicle may block line-of-sight, for example.

In step 512, the apparatus is configured to update the radio frequency signal properties of the one or more devices if the location and/or the propagation environment changes. If a device is moved to another location, the RF properties of the signal transmitted and/or received by the device change. The apparatus may update the properties based on the data received in step 502 or the apparatus may control performing ray tracing calculations based on the updated locations of one or more devices to obtain updated the radio frequency signal properties. The updated properties are transmitted to the RF controller.

Steps 510 and 512 may be performed in a loop as long as the test is performed.

In an embodiment, the apparatus may be configured to update the radio frequency signal properties of the one or more devices at given time intervals. Likewise, the apparatus may be configured to transmit control information to the radio frequency controller unit at given time intervals.

In an embodiment, the apparatus may be configured to control displaying the three-dimensional model of the given environment and the indicate the one or more devices in the given environment. A display connect to the apparatus 224 may be used for this purpose or one or more virtual reality or augmented reality glasses may also be used. The display or glasses may also be viewed over the Internet, for example.

In an embodiment, the apparatus may be configured to control displaying graphically the propagation paths of the radio frequency signals transmitted or received by the one or more devices in the given environment.

In an embodiment, the simulation may be paused and users may using the user interface of the apparatus directly or via Internet examine properties of the visualized radio frequency signals transmitted or received by the one or more devices. For example, a user may choose a given visualized signal beam of a device, examine the properties and tune a tunable parameter of the signal manually. The apparatus is configured to transmit the change in the parameter to the device and to the device under test. The paused test may be re-initialized and the effect of the change monitored.

In an embodiment, a user may be using the user interface of the apparatus directly or via Internet access and change the properties of the device under test 204.

In an embodiment, all test sequences or runs may be stored and re-run at a later time.

Figure 6:
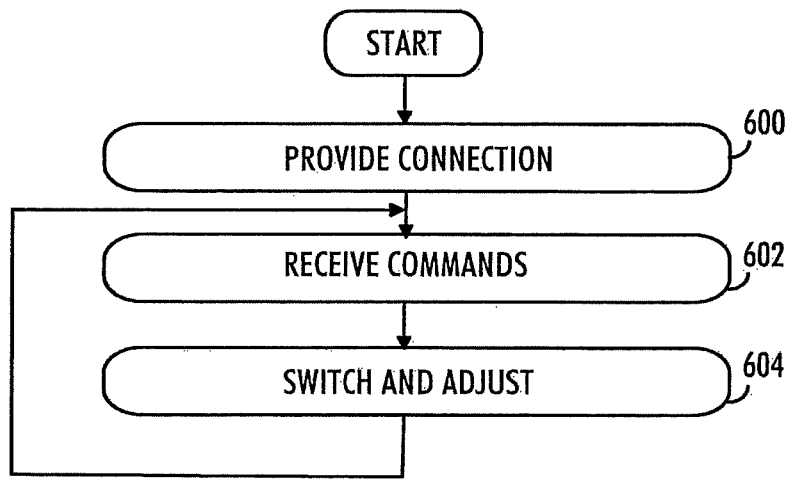

The flowchart of FIG. 6 illustrates an example of an embodiment. The flowchart illustrates an example of the operation of the RF controller apparatus 214 in connection with the control apparatus 224.

In step 600, the RF controller apparatus 214 is configured to provide a connection between one or more devices and a set of antenna elements. Thus when the device under test transmits a signal to the set of antenna elements, the one or more devices are capable of receiving the signal via the RF controller apparatus. The same applies to the other transmission direction.

In step 602, the RF controller apparatus is configured to receive commands to synchronically adjust switching and radiofrequency properties of the signals between the one or more devices and the set of antenna elements. Thus, the RF controller apparatus may receive instructions on how to control connections and properties of signals between the one or more devices and the set of antenna elements.

In step 604, the RF controller apparatus is configured to switch each device of the one or more devices to a given number of antenna elements of the set of antenna elements and adjust the amplitude, phase, and phase of the signals based on the received commands.

In an embodiment, the RF controller apparatus 214 may be configured to exchange with external apparatuses data related to the operation of the apparatus.

In an embodiment, the RF controller apparatus 214 may be configured to transmit information on the connections and properties of signals between the one or more user terminals or measurement devices and the one or more antenna elements synchronically during a given time period. Thus the control apparatus 224, for example, may receive the data and display the data visually.

In an embodiment, the RF controller apparatus 214 may be configured to receive commands from user interface. This allows a user to manually control the operation of the RF controller, make and run test sequences.

Figure 7:
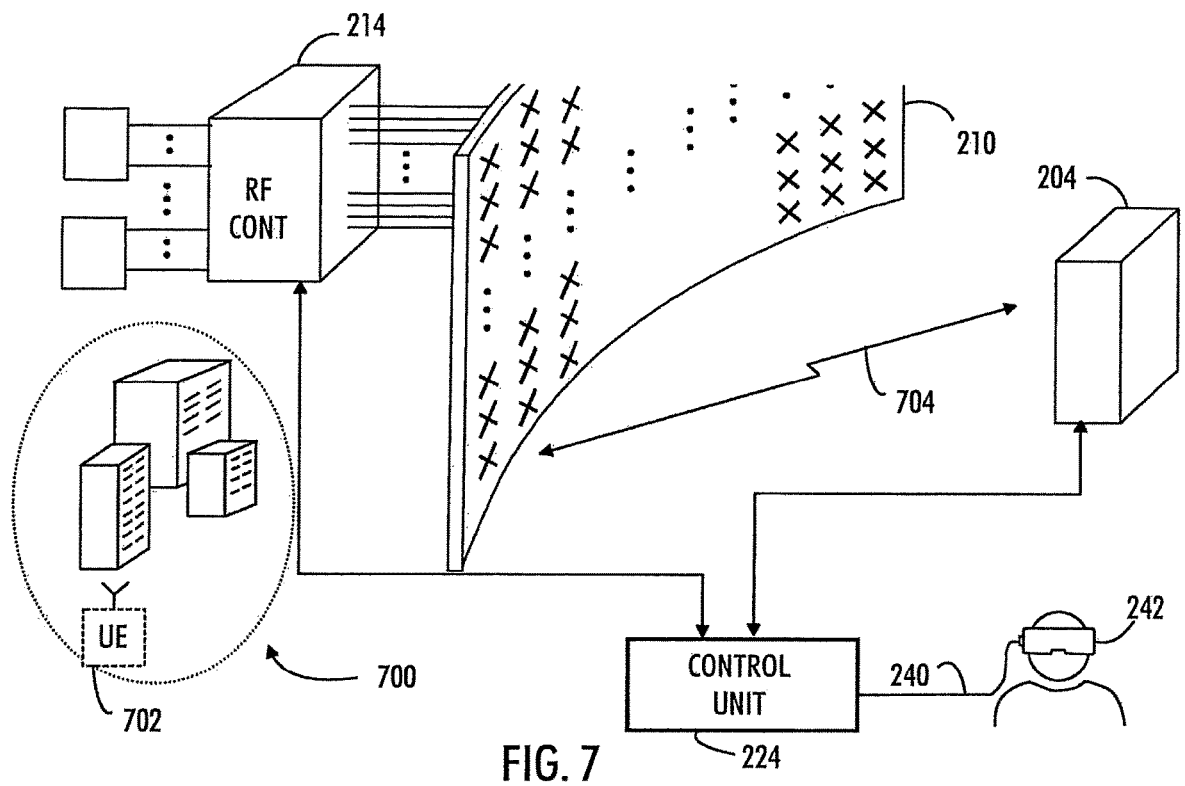
FIGS. 7, 8 and 9 illustrate simplified examples of testing scenarios.

FIG. 7 illustrates an embodiment. The figure illustrates an simplified example of a test scenario. In this example a 3D model of an urban environment 700 has been created and ray tracing calculation performed based on the 3D model. The control apparatus 224 has loaded the model and calculations. A device under test 204 (a base station or access point, for example) is placed in the environment. A non-moving user device 702 is placed in the environment so that it has a line of sight to the base station or access point. A user equipped with VR glasses 242 or a display is connected 240 to the apparatus 224 and sees the 3D model and the user device. The apparatus 224 controls the RF controller 214 to connect the user device 700 and the base station or access point 204. As there is a line of sight between the communicating devices the base station or access point may need only one beam 704 for communication and it may be directed towards the user device. In this example the device is located in the lower left corner of the environment and the beam is directed to an antenna element at the lower left corner of the wall structure 210. The apparatus 224 controls the RF controller 214 set suitable amplitude, phase and delay parameters, based on ray tracing calculations. The user with the VR glasses or display 242 may monitor the connection properties.

Figure 8:
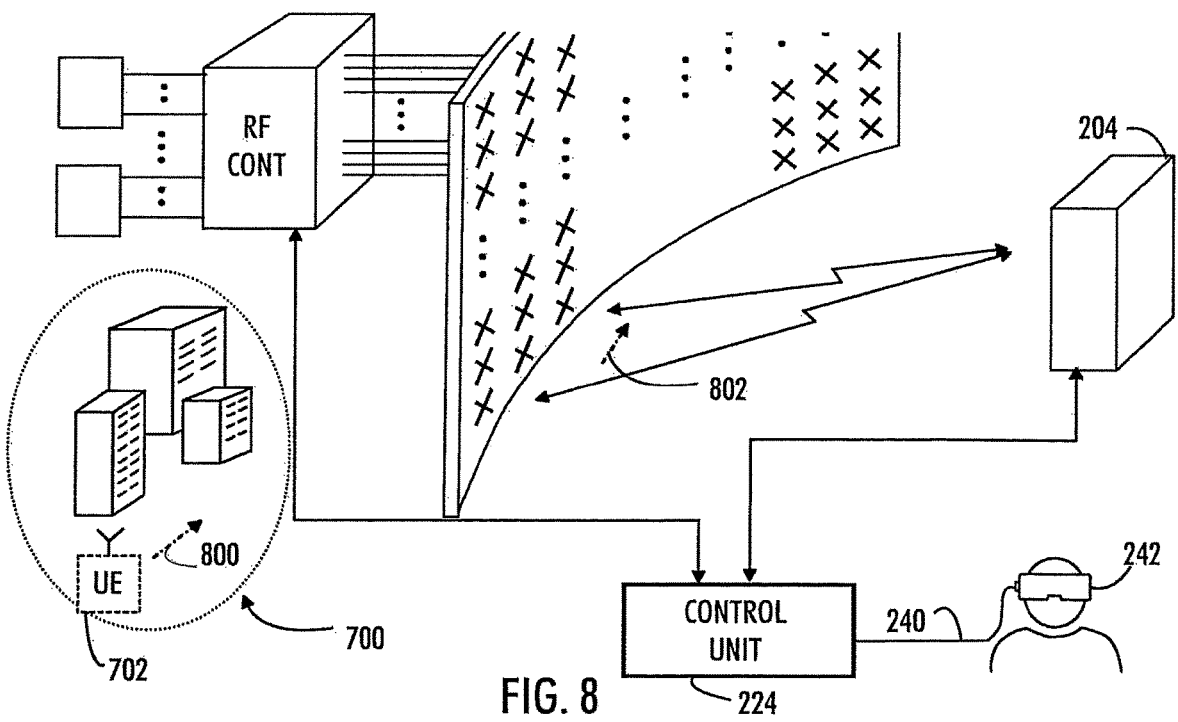

FIG. 8 illustrates an embodiment. The figure illustrates a simplified example of another test scenario. This scenario is similar to the scenario of FIG. 7 but in this example the user device 702 is moving to a given direction 800 in the given environment 700. A user equipped with VR glasses 242 or a display 242 is connected 240 to the apparatus 224 and sees the 3D model and the user device moving. The apparatus 224 controls the RF controller 214 to connect the user device 702 and the base station or access point 204. The antenna element the user device 702 is connected to is switched according to the movement so that the beam transmitted by the base station or access point moves 802 as well to the same direction. The user with the VR glasses or display may monitor the connection properties.

Figure 9:
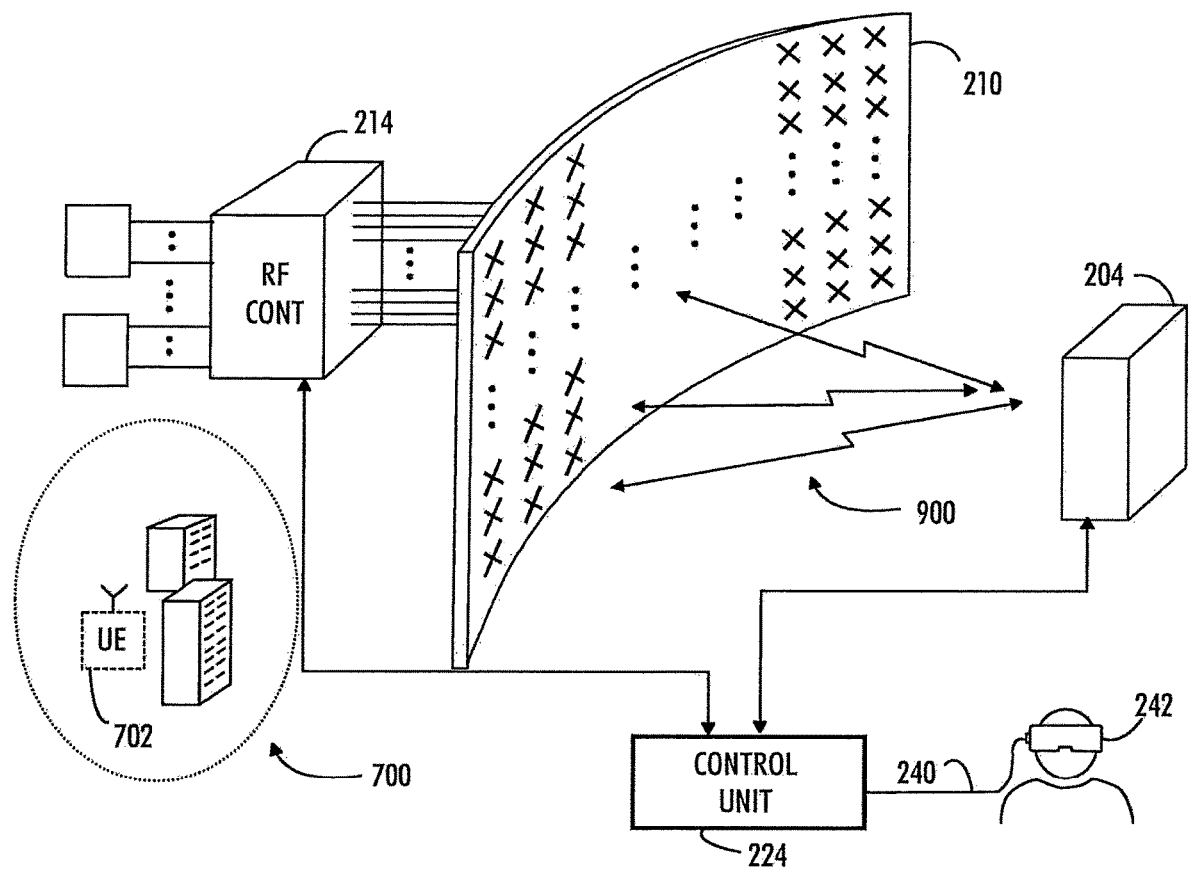

FIG. 9 illustrates an embodiment. The figure illustrates an simplified example of another test scenario. This scenario is similar to the scenario of FIG. 7 but in this example a non-moving user device 702 is located in the environment 700 in a non-line-of-sight location. The used device may be far away from base station or access point and behind buildings. In this case, as there is no direct line-of-sight, the user device and base station or access point may communicate only utilising one or more beams 900 reflected from surfaces surrounding the user device. Thus, the apparatus 224 controls the RF controller 214 to connect the user device 702 and the base station or access point 204 via one or more antenna elements of the wall structure and controls the RF controller 214 set suitable amplitude, phase and delay parameters for reflected beams, based on ray tracing calculations. The user with the VR glasses or display may monitor the connection properties.

In real test simulations, the number of user devices may be any combination of one user device to up to thousands, either stationary or moving, either computer controlled or user controlled. Each user device may have its own connection to base station or access point via the set of antenna elements controlled by the RF controller 214 based on instructions from the apparatus 224.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for testing cellular connections, comprising:
   circuitry to communicate with a radio frequency controller, where the radio frequency controller is configured for controlling connections between one or more devices and a set of antennae elements;
   circuitry to communicate with a device under test, where the device under test is configured to at least one of transmit one or more signals to the set of antenna elements or receive one or more signals from the set of antenna elements;
   circuitry to obtain a three-dimensional model of a given environment;
   circuitry to obtain ray tracing calculations describing propagation of radio frequency signals in the given environment;
   at least one processor; and
   at least one non-transitory memory storing instructions that, when executed with the at least one processor, cause the apparatus to:
      determine location of the one or more devices in the given environment;
      determine, utilising the ray tracing calculations, radio frequency signal properties of the one or more devices communicating with the device under test;
      transmit control information to the radio frequency controller for updating the connections between the one or more devices and a set of antenna elements to match with the determined properties;
      obtain information regarding the location of the one or more devices and regarding propagation environment of the one or more devices for updating the radio frequency signal properties of the one or more devices; and
      update the radio frequency signal properties of the one or more devices when the location or the propagation environment changes.

2. The apparatus of claim 1, where the instructions, when executed with the at least one processor, cause the apparatus to control performing the ray tracing calculations based on updated locations or propagation environments of the one or more devices to obtain updated the radio frequency signal properties.

3. The apparatus of claim 1, where the instructions, when executed with the at least one processor, cause the apparatus to update the radio frequency signal properties of the one or more devices at given time intervals.

4. The apparatus of claim 1, where the instructions, when executed with the at least one processor, cause the apparatus to transmit control information to the radio frequency controller at given time intervals.

5. The apparatus of claim 1, where the instructions, when executed with the at least one processor, cause the apparatus to control displaying the three-dimensional model of the given environment and indicate the one or more devices in the given environment.

6. The apparatus of claim 5, where the instructions, when executed with the at least one processor, cause the apparatus to control displaying graphically propagation paths of the radio frequency signals transmitted or received by the one or more devices in the given environment.

7. A method for testing cellular connections, comprising:
   obtaining a three-dimensional model of a given environment;
   obtaining ray tracing calculations describing propagation of radio frequency signals in the given environment;
   determining location of one or more devices in the given environment;
   determining, utilising the ray tracing calculations, radio frequency signal properties of the one or more devices communicating with the device under test;
   transmitting control information to a radio frequency controller for updating the connections between the one or more devices and a set of antenna elements to match with the determined properties;
   obtaining information regarding the location of the one or more devices and regarding propagation environment of the one or more devices; and
   updating the radio frequency signal properties of the one or more devices when the location or the propagation environment changes.

8. The method of claim 7, comprising control performing of the ray tracing calculations, based on the updating of the locations or propagation environments of the one or more devices, to obtain updated the radio frequency signal properties.

9. The method of claim 7, comprising updating the radio frequency signal properties of the one or more devices at given time intervals.

10. The method of claim 7, comprising transmitting control information to the radio frequency controller at given time intervals.

11. The method of claim 7, comprising controlling displaying of the three-dimensional model of the given environment and indicating of the one or more devices in the given environment.

12. The method of claim 7, further comprising controlling displaying graphically the propagation paths of the radio frequency signals transmitted or received by the one or more devices in the given environment.

13. An apparatus comprising:
at least one processor; and
at least one non-transitory memory storing instructions that, when executed with the at least one processor, cause the apparatus to:
　determine location of one or more devices in a given environment;
　determine, utilizing ray tracing calculations, radio frequency signal properties regarding a communication between the one or more devices and a device under test;
　transmit control information to a radio frequency controller, where the control information is configured for updating connections between the one or more devices and a set of antenna elements at least partially based upon the determined radio frequency signal properties;
　determine update information for updating the radio frequency signal properties of the one or more devices, where the determined update information is related to at least one of: the location of the one or more devices, or propagation environment of the one or more devices; and
　update the radio frequency signal properties of the one or more devices based upon the determined update information including changes to the location or the propagation environment.

* * * * *